Patented July 5, 1949

2,475,567

UNITED STATES PATENT OFFICE 2,475,567

CATALYTIC ACYLATION OF PHENYL ALKYL ETHERS

Alvin I. Kosak, Columbus, Ohio, and Howard D. Hartough, Pitman, N. J., assignors to Socony-Vacuum Oil Company, Incorporated, a corporation of New York No Drawing. Application May 14, 1946, Serial No. 669,582

13 Claims. (Cl. 260—592)

This invention relates to a process for the acylation of aromatic alkyoxy compounds and, more particularly, is directed to a method for acylating aromatic alkyl ethers in the presence of a porous absorptive silica-hydrous metallic oxide catalyst.

The acylation of aromatic alkoxy compounds, such as the phenyl alkyl ethers has heretofore been carried out in the presence of a Friedel-Crafts type catalyst, principally aluminum chloride. While, in some instances, a relatively high yield of product has been obtained employing such catalyst, the acylation process has not been altogether free of operational difficulties. Thus, it has been found necessary to use at least a molecular equivalent amount of aluminum chloride catalyst per mole of acylating agent employed in order to effectively promote the acylation reaction. When aromatic alkoxy compounds are heated with such relatively large amounts of aluminum chloride, there is a tendency for cleavage to occur in the alkoxy group with formation of the corresponding phenol. This reaction has, in fact, been employed in some instances to dealkylate aromatic alkoxy compounds. However, where it is desired to obtain as a final product an acylated alkoxy aromatic, the above-mentioned cleavage is definitely undesirable. It has accordingly been necessary, using an aluminum chloride catalyst in the acylation process, to work at low temperatures or to reduce the time of contact of the alkoxy compound with the catalyst in order to minimize cleavage in the alkoxy side chain.

Acylation of aromatic alkoxy compounds in the presence of the required relatively large amounts of aluminum chloride has been further complicated by the formation of complexes between aluminum chloride and certain of the phenyl alkyl ethers, such as anisole. The formation of said complexes tends to reduce the yield of desired product. Heretofore, in order to obtain a substantial yield of acylated product when an aluminum chloride catalyst was used, it has been necessary to carry out the reaction in the presence of a diluent or solvent material, such as petroleum ether or carbon disulfide, to effectively reduce the tendency toward formation of undesirable resinous byproducts, believed to be due primarily to the aforesaid complexes.

It has now been discovered that acylated aromatic alkoxy compounds may be obtained in an efficient manner by reacting the aromatic alkoxy compound to be treated with an acylating agent in the presence of a porous absorptive silica-hydrous metallic oxide catalyst. It has been found that by using said catalysts, the above-mentioned difficulties encountered in the acylation of aromatic alkoxy compounds have largely been overcome. Thus, by employing a catalyst comprising a composite of silica and a hydrous metallic oxide, the tendency for cleavage of the alkoxy group to occur is substantially reduced so that the acylation reaction can be carried out in a direct manner without a detailed observance of experimental conditions, particularly maintenance of a low temperature and short residence time such as is a necessary precaution to be taken when aluminum chloride is employed as catalyst. It has been found that silica-hydrous metallic oxide composites effect the acylation of aromatic alkoxy compounds without accompanying formation of complex addition products and that accordingly the necessity of using a diluent or solvent material such as has heretofore been necessary to obtain a substantial yield of desired product may be eliminated. The catalysts of the present invention, moreover, readily lend themselves to reactivation. Thus, silica-alumina, silica-zirconia, silica-thoria, and like catalysts contemplated for use herein may, after employment in promoting the acylation reaction, be reactivated by conventional means. A continuous process of acylation employing such catalysts may accordingly be used by alternate steps of carrying out the acylation, followed by reactivation of the catalyst.

It is, accordingly, an object of the present invention to provide an efficient process for synthesizing acylated aromatic alkoxy compounds. Another object is to provide a process for catalytically acylating said compounds. A still further object is to afford a process for catalytically acylating aromatic alkoxy compounds in the presence of an inexpensive, easily obtainable catalyst. A very important object is to provide a process capable of reacting aromatic alkoxy compounds with an acylating agent in the presence of small amounts of a catalyst without undue formation of addition complexes between catalyst and said compounds and, further, without the tendency of a cleavage to occur during acylation in the alkoxy group of said compounds leading to formation of the corresponding phenol.

These and other objects which will be recognized by those skilled in the art are attained in accordance with the present invention, wherein aromatic alkoxy compounds are acylated by reaction with organic carboxylic acid anhydrides or acyl halides in the presence of a porous absorptive silica-hydrous metallic oxide catalyst.

The catalyst to be used herein may either be a naturally occurring deposit or a synthetic gel composite of silica and one or more hydrous metallic oxides. Thus, naturally occurring silica-alumina clays of the montmorillonite type which have been activated have been found to be effective catalysts for promoting the acylation of aromatic alkoxy compounds. Typical of such products is the material sold under the trade name of Super-Filtrol. Other clays contemplated for use in the present process includes fuller's earth, attapulgus clay, and glauconite. In addition to the natural clays, synthetic silica-hydrous metallic oxide catalysts such as those extensively employed in the cracking of petroleum hydrocarbons may be used. These catalysts are synthetic, porous absorptive composites of silica and a metallic oxide and may be formed in various ways as, for example, precipitating silica on the hydrous oxide or the hydrous oxide on silica, or by combining a silica gel with the hydrous oxide, or by preparing a silica-hydrous oxide gel. Gel composites suitable for use as catalysts in the present invention include silica in combination with zirconia, alumina, titania, thoria, and the like. The synthetic or naturally occurring silica-hydrous metallic oxide catalysts are employed in the process of this invention, usually in a finely divided form and in amounts between about 1 and about 25 per cent based on the weight of the reactants.

Aromatic alkoxy compounds, in general, may be acylated by the process of this invention. These compounds comprise an aromatic group and an alkyl group joined by an ether linkage through an oxygen atom. The aromatic group so joined may be, for example, a phenyl, naphthyl or anthryl group or a substituted derivative thereof, such as tolyl, chlor-naphthyl, brom-anthryl and the like. The alkyl group may be a saturated or unsaturated radical, such as methyl, ethyl, benzyl, crotonyl, etc. The aromatic alkoxy compounds contemplated in this invention also include aromatic groups having attached thereto two or more alkoxy groups. Representative of the latter compounds are the dimethoxy benzenes, such as the dimethyl ether of catechol, resorcinol, and pyrogallol; the diethoxy benzenes; the dimethoxy naphthalenes; the diethoxy naphthalenes; dimethoxy anthracenes; the diethoxy anthracenes, etc. Veratrole (1,2, dimethoxy benzene) is a typical dialkyl ether which can be acylated in accordance with the present invention. The resulting acyl derivative can be easily converted into veratric acid, thus providing an efficient method for making this compound. Likewise, the synthesis of p-acetyl anisole, in accordance with the present invention, provides a relatively inexpensive means for making p-anisic acid therefrom by the haloform reaction. In a similar manner, other heretofore relatively expensive and difficultly obtainable compounds of interest to the drug industry might also be prepared from the acylated aromatic alkoxy compounds of this invention. While the description that follows hereinafter will be directed particularly to the acylation of these compounds, it should be understood that the present process will likewise be applicable for the acylation of aromatic alkoxy compounds generally.

The acylating agents to be used herein may be an acyl halide or an organic carboxylic acid anhydride. Included in the latter category are those compounds having the basic structure

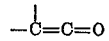

which, upon addition of water, yield organic carboxylic acids. These acylating agents may be derived by methods well known to the art from mono- or polybasic organic acids which may be either unsaturated or saturated. Thus, representative acylating agents to be used in this invention include the anhydrides of saturated fatty acids, such as acetic anhydride, propionic anhydride, ketene, etc.; the acyl halides of saturated fatty acids, such as acetyl chloride, stearoyl chloride, etc.; the acyl halides of dibasic acids, such as phthalyl chloride; the acyl halides of aromatic acids, such as benzoyl chloride; the anhydrides of unsaturated acids, such as crotonic anhydride; and the acyl halides of unsaturated acids, such as crotonyl chloride. These acylating agents are given merely by way of examples and are not to be construed as limiting, since other acyl halides or anhydrides of carboxylic acids which will readily suggest themselves to those skilled in the art may likewise be used.

The acylation of aromatic alkoxy compounds may be carried out employing equimolar quantities of said compound and acylating agent. However, in general, the presence of an excess of acylating agent has been found to give preferable results.

The reaction rate is largely a function of the temperature, increasing with increasing temperature, the upper limit of temperature being dependent on the boiling point of the reactant at the specific pressure of the reaction. In general, temperatures of between about 0° C. and about 150° C. and pressures of between atmospheric and about 10 atmospheres have been found satisfactory for effecting the acylation reaction. The effect of increased pressure, theoretically, is toward increased reaction but, from a practical standpoint, this is not a very great effect with reactions such as those involved herein which go readily at normal pressures. The temperature to be employed will depend on the time of reaction and the nature of the acylating agent used. Ordinarily, a pressure sufficient to maintain the reactants in the liquid phase is employed and this is more or less dependent upon the particular temperature involved. As a general rule, the higher the temperature, the higher the pressure and the lower the reaction time that is needed. It is, of course, to be understood that these reaction variables are more or less interdependent. Under the conditions encountered in the process of this invention, however, the reaction period will generally vary from about 1 to about 10 hours.

The silica-hydrous metallic oxide catalyst used herein may be employed in amounts as little as 1 per cent by weight of the reactants. The catalyst will consist predominantly of silica. One or more of the above-mentioned metallic oxides will be present in the catalyst, generally, in an amount less than about 40 per cent by weight of the catalyst employed. The weight ratio of silica to the hydrous metallic oxide used will, in general, accordingly be not less than 3:1 and preferably between about 4:1 and about 20:1.

The catalyst when used should preferably have a fairly small particle size. After continued use in the acylation process, the silica-hydrous metallic oxide catalyst becomes spent due to the deposition of impurities on its surface and may be reactivated by heating in air at an elevated temperature sufficient to burn off the impurities and hence restore the catalyst to its original activity. The original catalyst may accordingly be re-used a considerable number of times before it degenerates completely and must be discarded.

The acylation process described herein may be carried out either in batch or continuous operation. In the former instance, the aromatic alkoxy compound to be treated is contacted with an acylating agent in the presence of a silica-hydrous metallic oxide catalyst and the reactants are heated for a time sufficient to effect acylation. The catalyst is then removed from the reaction product mixture and said mixture, after water-washing and neutralization, is distilled to yield the acylated product. In a continuous operation, the reactants are contacted with a bed of the catalyst and allowed to remain in contact with said catalyst at a temperature and for a time sufficient to effect acylation. The reaction products are then removed from the catalyst bed and subjected to distillation. Unreacted aromatic alkoxy compound is recycled, together with a fresh reaction mixture of said compound and an acylating agent, the acylated product being recovered by selective distillation.

The following detailed examples are for the purpose of illustrating modes of effecting the acylation of aromatic alkoxy compounds in accordance with the process of this invention. It is to be clearly understood that this invention is not to be considered as limited to the specific acylating agents disclosed hereinafter or to the particular conditions set forth in the examples.

*Example 1*

To a mixture of 54 grams of anisole and 107 grams of acetic anhydride were added 20 grams of a synthetic silica-alumina catalyst ground to pass a 60-mesh screen. The materials were heated at a reflux temperature of 134–135° C. for a period of 6 hours. The resulting reaction mixture was then cooled and the catalyst removed by filtration. The filtrate was water-washed and then washed with sodium carbonate solution until neutral. The neutralized filtrate was then distilled, yielding 30 grams of para-acetylanisole. This yield represented a conversion of 60 per cent on the amount of anisole consumed. Eighteen grams of anisole, which could be recycled for further acylation, were recovered.

*Example 2*

To a mixture of 45 grams of phenetole and 107 grams of acetic anhydride were added 20 grams of a silica-zirconia synthetic gel containing 10 per cent zirconia. This catalyst had previously been ground to pass a 60-mesh screen. The mixture of reactants was treated exactly as in Example 1 and 27 grams of para-acetylphenetole were obtained. This amount represents a conversion of 81 per cent based on the amount of phenetole consumed. Eighteen grams of phenetole, which could be recycled for further acylation, were recovered from the reaction product mixture.

*Example 3*

To a mixture of 54 grams of anisole and 71 grams of benzoyl chloride were added 10 grams of Super-Filtrol clay and the mixture was heated at a reflux temperature increasing from 90° C. to 120° C. over a period of 6 hours. The reaction mixture was then cooled and the clay removed by filtration. The clay was washed with benzene and the washings were added to the filtrate. The combined filtrate and washings were washed with dilute caustic solution until neutral. The neutralized product was then distilled, removing the benzene and yielding 20 grams of para-benzoylanisole. This amount represent a 50 per cent conversion based on the weight of anisole consumed. Twenty-five grams of anisole, which could be recycled for further acylation, were recovered from the reaction product mixture.

*Example 4*

To a mixture of 54 grams of anisole and 71 grams of benzoyl chloride were added 20 grams of glauconite and the mixture was heated at a reflux temperature of from 90 to 120° C. over a period of 6 hours. The reaction product mixture at the end of this time was cooled and treated as in Example 3 to yield 19 grams of para-benzoylanisole. This amount represents a conversion of 17 per cent based on the weight of anisole used.

*Example 5*

To a mixture of 61 grams of phenetole and 71 grams of benzoyl chloride were added 5 grams of Super-Filtrol clay and the mixture was heated at a reflux temperature of 120 to 124° C. over a period of 6 hours. The reaction mixture was then cooled and the clay removed by filtration. The clay was washed with benzene and the washings were added to the filtrate. The combined filtrate and washings were washed with dilute caustic solution until neutral. The neutralized product was then distilled, removing the benzene and yielding 19 grams of para-benzoyl phenetole. The amount represents an 84 per cent conversion based on the weight of phenetole consumed. Forty-nine grams of phenetole, which could be recycled for further acylation, were recovered from the reaction product mixture.

We claim:

1. A process for acylating a phenyl alkyl ether, comprising reacting the same with an acylating agent selected from the group consisting of acyl halides of carboxylic acids and anhydrides of carboxylic acids in the presence of a porous absorptive catalyst selected from composites consisting essentially of silica and alumina and composites consisting essentially of silica and zirconia.

2. A process for acylating a phenyl alkyl ether, comprising reacting the same with an acylating agent selected from the ground consisting of acyl halides of carboxylic acids and anhydrides of carboxylic acids in the presence of a catalyst consisting essentially of a porous absorptive silica-alumina clay.

3. A process for acylating a phenyl alkyl ether, comprising reacting the same with an acylating agent selected from the group consisting of acyl halides of carboxylic acids and anhydrides of carboxylic acids in the presence of a catalyst consisting essentially of a porous absorptive synthetic silica-alumina composite.

4. A process for acylating a phenyl alkyl ether, comprising reacting the same with an acylating agent selected from the group consisting of acyl halides of carboxylic acids and anhydrides of carboxylic acids in the presence of a catalyst consisting essentially of a porous absorptive synthetic silica-zirconia composite.

5. A process for acylating a phenyl alkyl ether, comprising reacting the same with an acylating agent selected from the group consisting of acyl halides of carboxylic acids and anhydrides of carboxylic acids in the presence of a catalyst consisting essentially of a porous absorptive activated silica-alumina clay, the silica-alumina ratio of which is between about 4:1 and about 20:1.

6. A process for acylating anisole, comprising reacting the same with an acylating agent selected from the group consisting of acyl halides of carboxylic acids and anhydrides of carboxylic acids in the presence of a porous absorptive catalyst selected from composites consisting essentially of silica and alumina and composites consisting essentially of silica and zirconia.

7. A process for acylating anisole, comprising reacting the same with an acylating agent selected from the group consisting of acyl halides of carboxylic acids and anhydrides of carboxylic acids in the presence of a catalyst consisting essentially of a porous absorptive silica-alumina clay.

8. A process for acylating phenetole, comprising reacting the same with an acylating agent selected from the group consisting of acyl halides of carboxylic acids and anhydrides of carboxylic acids in the presence of a porous absorptive catalyst selected from composites consisting essentially of silica and alumina and composites consisting essentially of silica and zirconia.

9. A process for acylating phenetole, comprising reacting the same with an acylating agent selected from the group consisting of acyl halides of carboxylic acids and anhydrides of carboxylic acids in the presence of a catalyst consisting essentially of a porous absorptive silica-alumina clay.

10. A process for acylating a phenyl alkyl ether, comprising reacting the same with an acylating agent selected from the group consisting of acyl halides of carboxylic acids and anhydrides of carboxylic acids at a temperature of between about 0° C. and about 150° C. for a period of from about 1 to about 10 hours in the presence of between about 1 and about 25 per cent by weight of a porous absorptive catalyst selected from composites consisting essentially of silica and alumina and composites consisting essentially of silica and zirconia.

11. A process for acylating anisole, comprising reacting the same with an acylating agent selected from the group consisting of acyl halides of carboxylic acids and anhydrides of carboxylic acids at a temperature of between about 0° C. and about 150° C. for a period of from about 1 to about 10 hours in the presence of between about 1 and about 25 per cent by weight of a porous absorptive catalyst selected from composites consisting essentially of silica and alumina and composites consisting essentially of silica and zirconia.

12. A process for acylating phenetole, comprising reacting the same with an acylating agent selected from the group consisting of acyl halides of carboxylic acids and anhydrides of carboxylic acids at a temperature of between about 0° C. and about 150° C. for a period of from about 1 to about 10 hours in the presence of between about 1 and about 25 per cent by weight of a porous absorptive catalyst selected from composites consisting essentially of silica and alumina and composites consisting essentially of silica and zirconia.

13. A process for acylating a phenyl alkyl ether, comprising reacting the same with an acylating agent selected from the group consisting of acyl halides of carboxylic acids and anhydrides of carboxylic acids in the presence of a catalyst consisting essentially of glauconite.

ALVIN I. KOSAK.
HOWARD D. HARTOUGH.

REFERENCES CITED

The following references are of record in the file of this patent:

UNITED STATES PATENTS

| Number | Name | Date |
|---|---|---|
| 2,018,065 | Ipatieff | Oct. 22, 1935 |
| 2,225,651 | McNally et al. | Dec. 24, 1940 |
| 2,369,691 | Schmerling et al. | Feb. 20, 1945 |
| 2,386,007 | Schmerling et al. | Oct. 2, 1945 |
| 2,432,991 | Hartough et al. | Dec. 23, 1947 |

OTHER REFERENCES

Sachanen et al., Ind. Eng. Chem., vol. 38, pages 43–45, Jan. 16, 1946.